United States Patent
Hirabayashi et al.

[11] Patent Number: 6,039,465
[45] Date of Patent: Mar. 21, 2000

[54] SERVICE COVER FOR A REAR COMBINATION LAMP

[75] Inventors: Mineo Hirabayashi; Mamoru Hozumi, both of Aichi-ken, Japan; Kinsho Fukuta, Derby, United Kingdom

[73] Assignee: Kabushiki Kaisha Toyoda Jidoshokki Seisakusho, Aichi-ken, Japan

[21] Appl. No.: 09/168,820

[22] Filed: Oct. 8, 1998

[30] Foreign Application Priority Data

Oct. 8, 1997 [JP] Japan ................................ 9-276054

[51] Int. Cl.[7] .............................. F21V 17/00; B60R 5/00; B60R 13/01; E06B 5/00
[52] U.S. Cl. .................. 362/496; 362/506; 362/544; 296/37.1; 296/39.1; 49/463; 49/501
[58] Field of Search ................... 296/37.1, 39.1, 296/901; 362/374, 375, 506, 544, 488, 493, 496; 49/463, 501

[56] References Cited

U.S. PATENT DOCUMENTS

| | | | |
|---|---|---|---|
| 4,168,095 | 9/1979 | Temino et al. | 296/70 |
| 4,777,567 | 10/1988 | Wen | 362/544 |
| 4,872,443 | 10/1989 | Ruark | 49/163 |
| 4,934,480 | 6/1990 | Gate et al. | 181/150 |
| 5,022,699 | 6/1991 | Yoshida | 362/492 |
| 5,055,983 | 10/1991 | Hunold et al. | 362/544 |
| 5,128,839 | 7/1992 | Kato | 362/544 |
| 5,136,484 | 8/1992 | Eaton | 362/548 |
| 5,433,498 | 7/1995 | Ishiwata | 296/39.1 |
| 5,550,718 | 8/1996 | Shy | 362/546 |
| 5,623,801 | 4/1997 | Drumbl | 52/514 |
| 5,639,140 | 6/1997 | Labrash | 296/39.1 |
| 5,669,698 | 9/1997 | Veldman et al. | 362/494 |
| 5,671,996 | 9/1997 | Bos et al. | 362/488 |
| 5,765,312 | 6/1998 | Szyjkowski | 49/465 |

FOREIGN PATENT DOCUMENTS 2-59308  4/1990  Japan .
7-52824  2/1995  Japan .

*Primary Examiner*—Cassandra Spyrou
*Assistant Examiner*—John Juba, Jr.
*Attorney, Agent, or Firm*—Morgan & Finnegan, L.L.P.

[57] ABSTRACT

A service cover for a rear combination lamp is provided with a substantially rectangular cover body having an area enough to close a working hole, first and second retainer portions projecting from a pair of opposite sides of the cover body in opposite directions, respectively, and a jaw portion formed at a tip end of the first retainer portion for preventing the falling of the service cover. The working hole is closed by inserting the first and second retainer portions into slits formed at both edge portions of the working hole, respectively, and the working hole is opened by drawing the second retainer portion from the corresponding slit and rotating the cover body about the first retainer portion.

8 Claims, 5 Drawing Sheets

SERVICE COVER FOR A REAR COMBINATION LAMP

BACKGROUND OF THE INVENTION

1. Field of the Invention

The present invention relates to a service cover mounted on working holes formed in a trim within a trunk room for service work of a rear combination lamp of an automotive vehicle.

2. Description of the Related Art

Many conventional automotive vehicles are constructed so that the service work of a rear combination lamp (mainly exchanging bulbs) may be performed from the interior of a trunk room under the condition that the rear combination lamp is mounted.

FIG. 8 schematically shows a rear portion of an automotive vehicle. A trim 23 is provided in a trunk room 21 for the purpose of enhancing an aesthetic design in the room and protecting an automotive body. Working holes 24 for service work of rear combination lamps 22 are formed in the trim 23. The working holes 24 are normally closed by service covers 25.

As shown in FIGS. 9 and 10, the conventional service cover 25 is made of hard resin or the like. A retainer claw 26 provided on one side edge of the service cover is inserted and retained on a side edge rear surface side of the working hole 24 of the trim 23. On the other hand, a movable retainer piece 28 with an operating knob 27 mounted on the opposite side edge of the service cover is retained and mounted on the side edge rear surface side on the opposite side of the working hole 24. The service work of the rear combination lamp 22 is performed under the condition that the service cover 25 is removed from the trim 23.

However, in case of the conventional service cover 25 described above, the retainer piece 28 with the operating knob 27 must be manufactured separately and assembled in the cover. The conventional system suffers from a problem that the manufacture cost is increased. Also, whenever the service work of the rear combination lamp 22 is performed, the service cover must be attached to and detached from the trim 23. Therefore, the conventional system suffers from a problem that its handling performance is deteriorated and in addition, since the service cover would be removed completely from the trim 23, it might be lost.

SUMMARY OF THE INVENTION

In view of the foregoing problems, an object of the present invention is to provide a service cover for a rear combination lamp which may reduce a manufacture cost and enhance a handling property.

In order to attain the above-described and other objects, according to the present invention, there is provided a service cover which opens and closes a working hole formed in a trim of a trunk room for service work of the rear combination lamp, comprising: a substantially rectangular cover body having an area enough to cover the working hole; first and second retainer portions projecting from a pair of opposite sides of the cover body in opposite directions, respectively; and jaw portions formed at a tip end of the first retainer portion for preventing the falling of the service cover; the working hole being closed by inserting the first and second retainer portions into slits formed at both edge portions of the working hole, respectively, the working hole being opened by drawing the second retainer portion from the corresponding slit and rotating the cover body about the first retainer portion.

Since the jaw portions for preventing the falling of the service cover are formed at the tip end of the first retainer portion, when the second retainer portion is pulled apart from the corresponding slit and the cover body is rotated about the first retainer portion to open the working hole, the jaw portions are retained at the edge portions of the corresponding slit so that the service cover is held without falling from the trim. Namely, it is possible to perform the service work such as a bulb exchange for the rear combination lamp while opening the working hole under the condition that the service cover is mounted on the trim. Accordingly, the handling property of the service cover is enhanced and at the same time the service cover is prevented from being lost.

Also, the service cover does not need any assembling parts and can be manufactured as a single integrally molded article. Therefore, the manufacture cost may be reduced.

DESCRIPTION OF THE PREFERRED EMBODIMENTS

Figure 1:
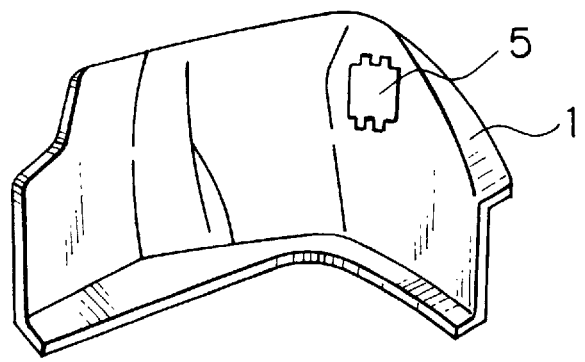
FIG. 1 is a perspective view showing a trim provided with a service cover for a rear combination lamp in accordance with one embodiment of the present invention.
Figure 2:
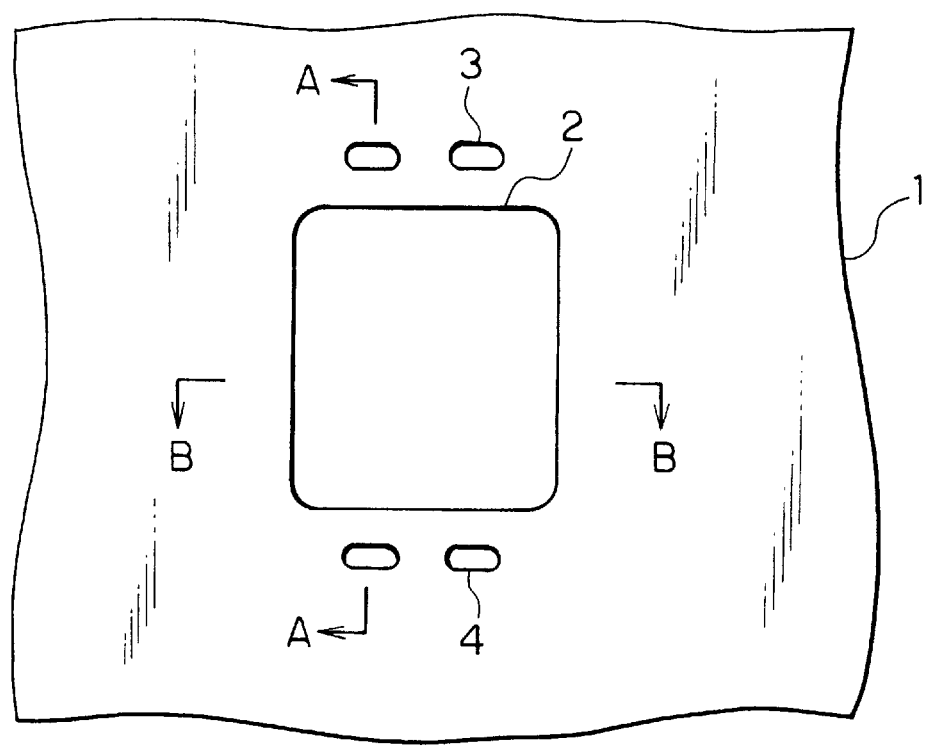
FIG. 2 is a front view showing a working hole formed in the trim.
Figure 8:
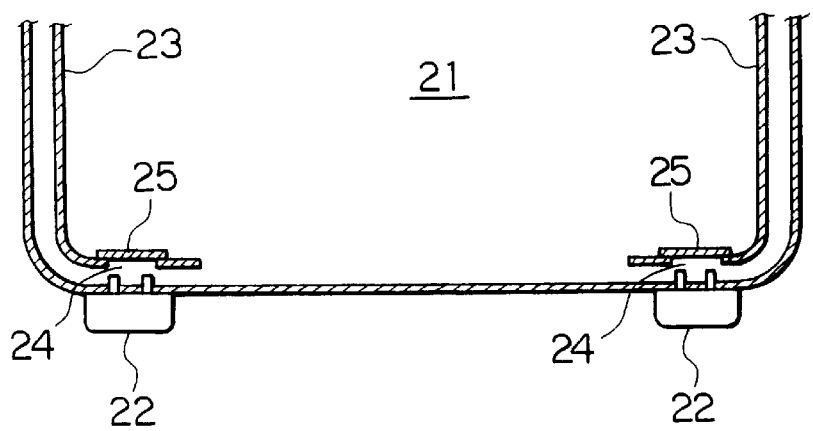
FIG. 8 is a schematic cross-sectional view showing the trunk room and its vicinity in a rear portion of an automotive body.
Figure 9:
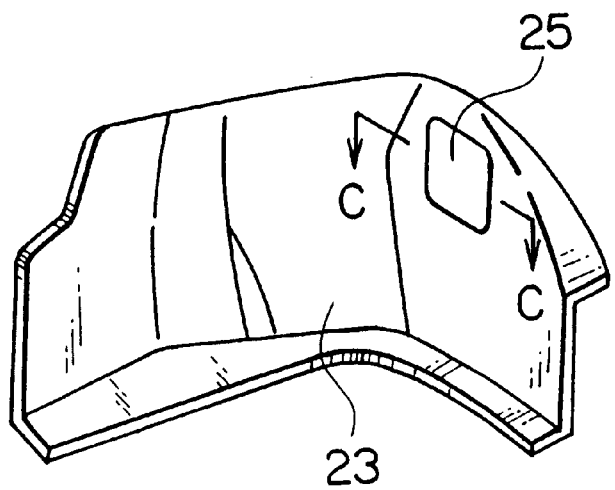
FIG. 9 is a perspective view showing a trim provided with a conventional service cover.
Figure 10:
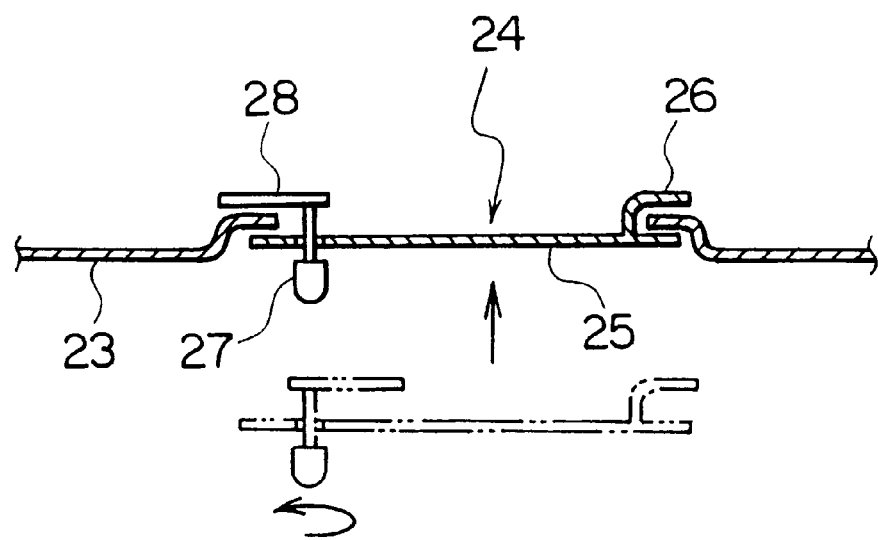
FIG. 10 is a cross-sectional view taken along the line C—C of FIG. 9.

An embodiment of the present invention will now be described by way of example with reference to FIGS. 1 to 6. FIG. 1 shows a trim set within a trunk room on the right side. A trim 1 according to the present embodiment is formed into a substantially L-shape in plan view so as to cover a part of a side portion and a rear portion in a trunk room 21 as shown in FIG. 8. A working hole 2 for service work of a rear combination lamp 22 is located at a position corresponding to the mounting portion of the rear combination lamp 22 in the trim 1. The working hole 2 is formed in an elongated rectangle shape as shown in FIG. 2. Furthermore, pairs of slits 3 and 4 for mounting the cover are formed in the trim 1 on the upper and lower sides of the working hole 2, respectively.

Figure 3:
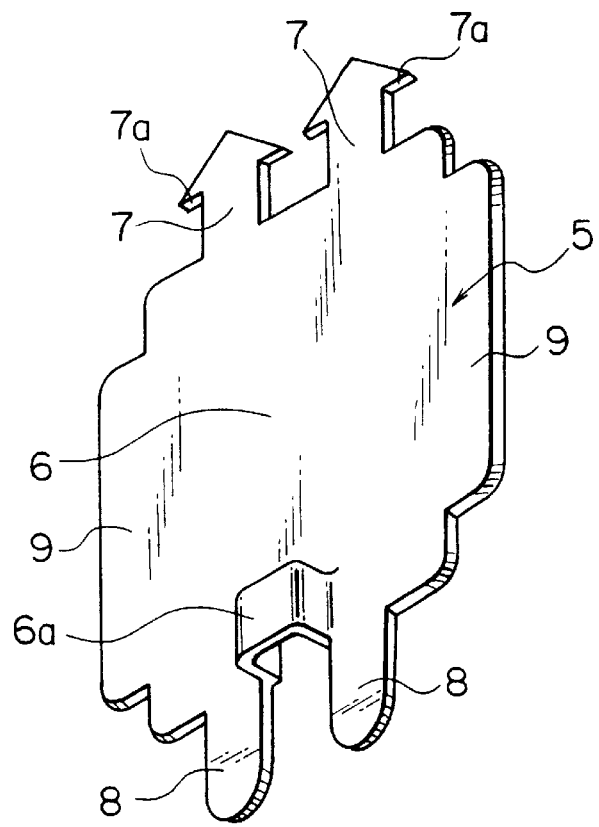
FIG. 3 is a perspective view showing the service cover.
Figure 4:
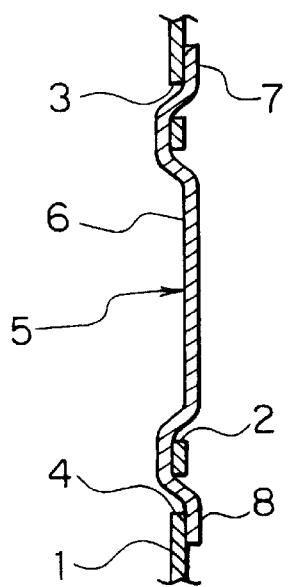
FIGS. 4 and 5 are cross-sectional views taken along the lines A—A and B—B of FIG. 2 under the condition that the service cover is mounted on the trim, respectively.
Figure 5:
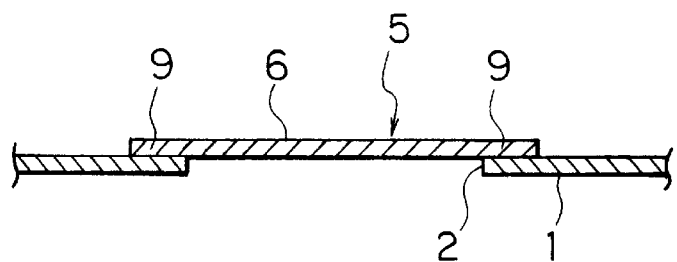

FIG. 3 shows a service cover 5 for covering the working hole 2 of the trim 1. FIGS. 4 and 5 are cross sections showing the condition that the service cover 5 is mounted on the trim 1. The service cover 5 is a flat single integrally molded article having a square cover body 6 that may cover the working hole 2. Pairs of upper and lower retainer pieces 7 and 8 insertable into the slits 3 and 4 of the trim 1, respectively, and integrally projecting in the opposite directions to each other are formed upper and lower edges of the cover body 6. The head portion of each upper retainer pieces 7 is formed in a triangular shape like an arrow and is provided with jaw portions 7a retainable at the right and left end portions of the corresponding slit 3 for preventing falling.

Also, the lateral width of the cover body 6 is somewhat greater than the lateral width of the working hole 2 so that the service cover 5 has at its both right and left edge portions integral flanged portions 9 projecting in a direction (right and left directions) perpendicular to the projecting direction of the retainer pieces 7 and 8. The flanged portions 9 are inserted into the side edge rear surfaces on both right and left sides of the working hole 2 to be retained when mounting on the cover.

Namely, the service cover 5 according to this embodiment is mounted on the trim 1 as shown in FIGS. 4 and 5 by inserting the upper and lower retainer pieces 7 and 8 into the slits 3 and 4 of the trim 1 from the top surface side of the trim 1 to be retained on the rear surface side and by inserting the right and left flanged portions 9 onto the side edge rear surface of the working hole 2 to be retained thereon.

Accordingly, the service cover 5 is formed of material having suitable resiliency or flexibility so that the retainer pieces 7 and 8 and the flanged portions 9 may be readily inserted as described above.

Also, as shown in FIG. 3, a finger insertion portion 6a for being used when the cover is to be opened is formed by projecting, at the portion of the lower portion of the cover body 6, a portion between the proximal ends of the two retainer pieces 8 on the top surface side.

Figure 6A:
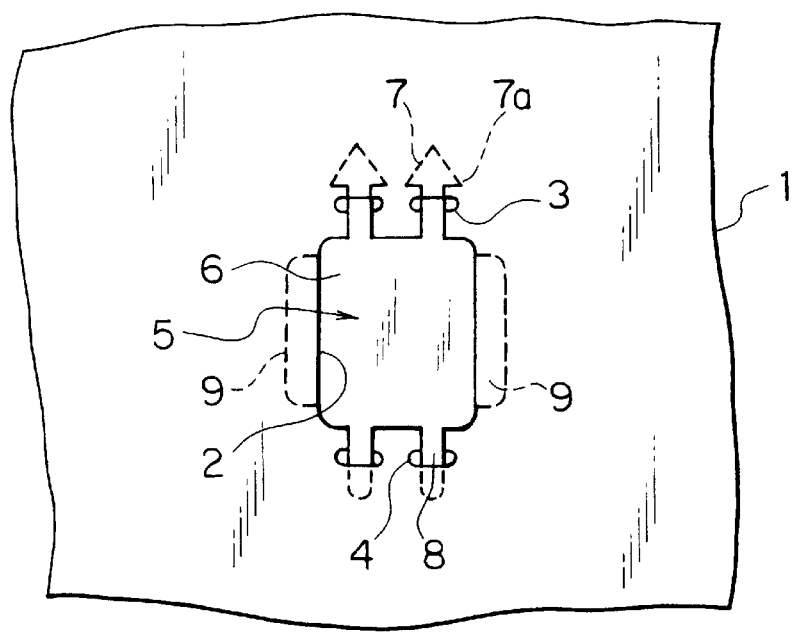
FIG. 6A is a front view showing a condition that the working hole of the trim is closed with the service cover.

As shown in FIG. 6A, the thus constructed service cover 5 is normally mounted on the trim 1 to close the working hole 2 under the condition that the upper and lower retainer pieces 7 and 8 are inserted into the slits 3 and 4 and retained thereon while the right and left flanged portions 9 are inserted onto the side edge rear surface of the working hole 2 and retained thereon.

By the way, in the case where the interior of the trunk room is heated at a high temperature, the mounted service cover 5 might be affected by the heat so that the edge portion thereof would warp on the top surface side. However, in this embodiment, with respect to the right and left edge portions, since the flanged portions 9 are retained on the side edge rear surface of the working hole 2, the above-described warpage is avoided. Also, with respect to the upper and lower edge portions, since a distance from the respective retainer pieces 7 and 8 to the edge portions on the corresponding side is decreased by arranging the pairs of retainer pieces 7 and 8 on the side of the right and left edges, the generation of the warpage may be effectively suppressed. Therefore, the aesthetic design of the cover edge portions is enhanced with such a structure.

Incidentally, it is possible to use a single retainer piece having a large width instead of the pair of retainer pieces 7 or 8. However, in this case, the length of each slit 3 or 4 must be increased so that the rigidity of the circumferential portion of the working hole 2 might be degraded, thereby it is not desirable.

Figure 6B:
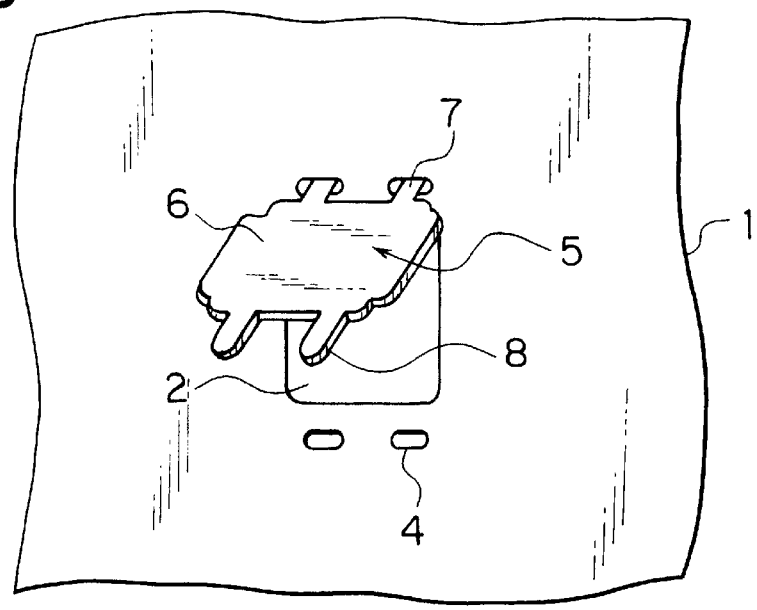
FIG. 6B is a front view showing a condition that the working hole of the trim is opened by rotating the service cover.

In the service work of the rear combination lamp, a finger tip is inserted into the finger insertion portion 6a, and the lower retainer pieces 8 and the right and left flanged portions 9 are drawn away with the use of elastic deformation or flexibility. By this operation, as shown in FIG. 6B, the service cover 5 is rotated upwardly about the upper retainer pieces 7 so that the working hole 2 may be opened. In this case, since the jaw portions 7a provided in the upper retainer pieces 7 are retained at the end portions of the slits 3, the falling of the service cover 5 from the trim 1 is prevented.

Accordingly, thereafter, it is possible to perform the service work such as bulb exchange of the rear combination lamp through the working hole 2. After the service work, the right and left flanged portions 9 are inserted into the side edge rear surface of the working hole 2 while the lower retainer pieces 8 are inserted into the slits 4 so that the working hole 2 may be closed.

Namely, according to this embodiment, since the service work may be performed without completely removing the service cover 5 away from the trim 1, the handling property of the service cover 5 is enhanced in comparison with the conventional manner required to perform the attachment/detachment for every service work. Thus, the service cover 5 is never lost.

Further, since the service cover 5 is the single integrally molded article having no assembling parts, it is possible to suppress the increase of the manufacture cost in comparison with the conventional service cover having the assembling parts.

Furthermore, in the present embodiment, since the service cover 5 is made of the same material as that of the trim 1, more specifically, felt, it is possible to produce the service cover 5 and the trim 1 by using a single molding die.

Namely, in the case where the trim 1 is molded by heat press by using, for example, a sheet-like felt, it is possible to simultaneously mold the trim 1 and the service cover 5 by a single molding die provided with molding surfaces for the service cover adjacent to the trim molding surfaces. In addition, since the service cover 5 itself is much smaller in size than the trim 1, it is possible to mold the service cover 5 by utilizing cut pieces generated in molding the trim 1 to enhance the yield. For this reason, in comparison with the conventional products, it is possible to provide a less expensive service cover 5 by reducing the cost concerning the molding work.

Also, when the components are made of the same material, a uniformity in design to the trim 1 under the condition that the service cover is mounted onto the trim 1 may be ensured and the aesthetic design is enhanced.

In the above-described embodiment, the service cover 5 is rotated about the upper retainer pieces 7. However, it is possible to change the rotational pivot to the lower portion or either one of the right and left sides. Also, the shape of the trim 1 or the working hole 2 is not limited to that shown in the drawings. Also, the shape of the service cover 5 and the material therefor are not limited.

Figure 7:
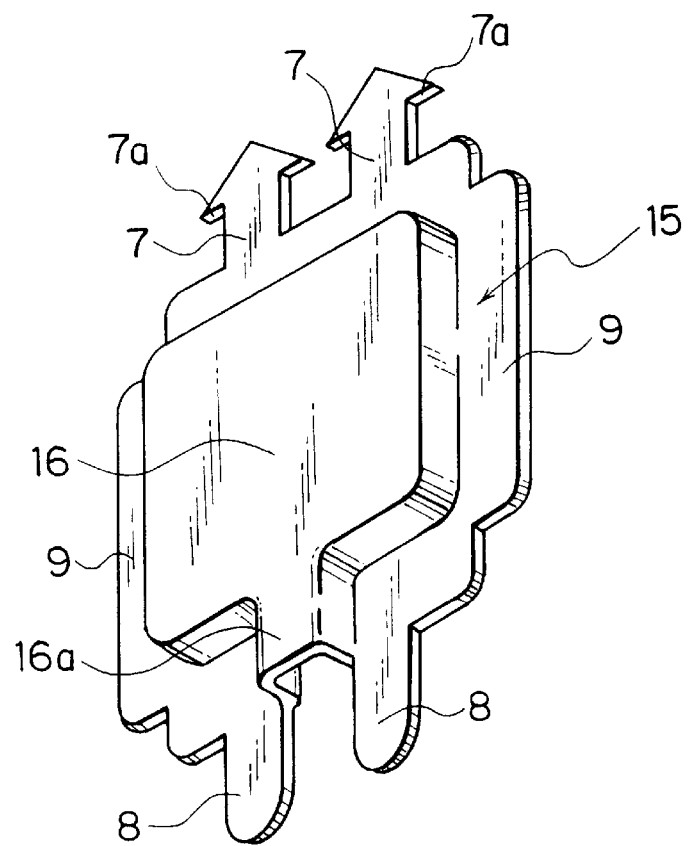
FIG. 7 is a perspective view showing a modified service cover.

Also, in the foregoing embodiment, as shown in FIG. 3, the service cover 5 is formed into a substantially flat shape. However, as shown in FIG. 7, a central portion of a cover body 16 may be molded by projecting into a substantially rectangular shape on the top surface so as to be in communication with a finger insertion portion 16a. In this case, taking the aesthetic design into consideration, it is preferable that the height of the projecting portion is set to the same lavel as that of the finger insertion portion 16a. Further, it is possible to increase a surface rigidity of a service cover 15 by providing such a projecting portion.

As described above in detail, according to the present invention, since it is possible to perform the service work such as bulb exchange of the rear combination lamp while the working hole is opened under the condition that the service cover is mounted on the trim, the handling property of the service cover is enhanced, and the service cover is never lost. Also, the service cover according to the present invention does not need any assembling parts, and it is possible to form as the single integrally molded article, thereby to reduce the manufacture cost.

What is claimed is:

1. A service cover which opens and closes a working hole formed in a trim in a trunk room for service work of the rear combination lamp, said service cover comprising:

a substantially rectangular cover body having an area enough to cover the working hole;

first and second retainer portions projecting from a pair of opposite sides of said cover body in opposite directions, respectively; and jaw portions formed at a tip end of the first retainer portion for preventing the falling of said service cover;

the working hole being closed by inserting said first and second retainer portions into slits formed at both edge portions of the working hole, respectively, the working hole being opened by drawing the second retainer portion away from the corresponding slit and rotating the cover body about the first retainer portion.

2. The service cover according to claim 1, further comprising a pair of flanged portions projecting in a direction perpendicular to the first and second retainer portions from the other pair of sides of the cover body, respectively, the flanged portions being inserted onto a rear surface side of edge portions of the working hole when the working hole is closed.

3. The service cover according to claim 1, wherein each of said first and second retainer portions includes at least two retainer pieces which are in parallel with each other.

4. The service cover according to claim 1, further comprising a finger insertion portion formed in the vicinity of said second retainer portion of the cover body, said second retainer portion being pulled apart from the corresponding slit by drawing the finger insertion portion with an operator's finger hooking at the finger insertion portion when the working hole is opened.

5. The service cover according to claim 4, wherein said finger insertion portion is formed by projecting on a top surface side a part of the side of the cover body from which the second retainer portion projects.

6. The service cover according to claim 5, wherein a central portion of the cover body is projected on the top surface side to be in communication with the finger insertion portion.

7. The service cover according to claim 1, wherein the service cover is made of resilient or flexible material.

8. The service cover according to claim 1, wherein the service cover is made of the same material as that of a trim.

* * * * *